(12) United States Patent
Vadder et al.

(10) Patent No.: US 10,465,994 B2
(45) Date of Patent: Nov. 5, 2019

(54) THERMAL STORAGE ICE BREAKER APPARATUS

(71) Applicant: Evapco, Inc., Taneytown, MD (US)

(72) Inventors: Davey Vadder, Westminster, MD (US); Jeff Kane, Biglerville, PA (US)

(73) Assignee: Evapco, Inc., Taneytown, MD (US)

( * ) Notice: Subject to any disclaimer, the term of this patent is extended or adjusted under 35 U.S.C. 154(b) by 0 days.

(21) Appl. No.: 15/080,311

(22) Filed: Mar. 24, 2016

(65) Prior Publication Data

US 2017/0023309 A1  Jan. 26, 2017

Related U.S. Application Data

(60) Provisional application No. 62/137,357, filed on Mar. 24, 2015.

(51) Int. Cl.
| | |
|---|---|
| F28D 20/00 | (2006.01) |
| C09K 5/06 | (2006.01) |
| F25C 5/10 | (2006.01) |
| F25D 3/00 | (2006.01) |
| F24F 5/00 | (2006.01) |
| F28D 20/02 | (2006.01) |
| F28F 1/10 | (2006.01) |

(52) U.S. Cl.
CPC ............ *F28D 20/0034* (2013.01); *C09K 5/06* (2013.01); *F24F 5/0017* (2013.01); *F25C 5/10* (2013.01); *F25D 3/005* (2013.01); *F28D 20/02* (2013.01); *F28F 1/10* (2013.01); *Y02E 60/147* (2013.01)

(58) Field of Classification Search
CPC .... F28D 20/0034; F28D 20/02; F24F 5/0017; F25D 3/005; F25D 17/02; F25D 16/00; F25C 5/10; C09K 5/06; Y02E 60/147; F28F 1/10

See application file for complete search history.

(56) References Cited

U.S. PATENT DOCUMENTS

| | | | | |
|---|---|---|---|---|
| 2,954,679 A * | 10/1960 | Blackett | ............ | F25C 1/08 62/139 |
| 4,685,304 A * | 8/1987 | Essig | ............ | F25C 1/08 249/140 |
| 6,178,770 B1 * | 1/2001 | Bradley, Jr. | ............ | F24F 5/0017 165/172 |
| 9,217,596 B2 * | 12/2015 | Hall | ............ | F25C 1/08 |
| 2009/0049858 A1 * | 2/2009 | Lee | ............ | F25C 1/08 62/349 |

FOREIGN PATENT DOCUMENTS

| | | | | |
|---|---|---|---|---|
| CN | 201444009 U | * | 4/2010 | |
| JP | H08152162 A | * | 6/1996 | ............ Y02E 60/142 |

* cited by examiner

*Primary Examiner* — Emmanuel E Duke
(74) *Attorney, Agent, or Firm* — Whiteford, Taylor & Preston, LLP; Peter J. Davis

(57) ABSTRACT

An internal melt ice thermal storage device having an ice build/melt coils with tubes fitted with extensions or "fins" that transfer heat from the thermal transfer medium in the tubes to distal portions of the ice rings that surround said tubes in order to define the shape of the liquid meniscus between the tube and ice allowing the ice to break free from the tube near the initiation of melt.

6 Claims, 9 Drawing Sheets

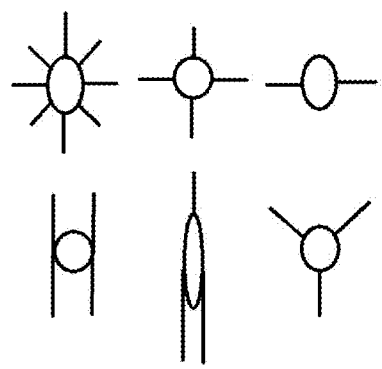
Figure 11
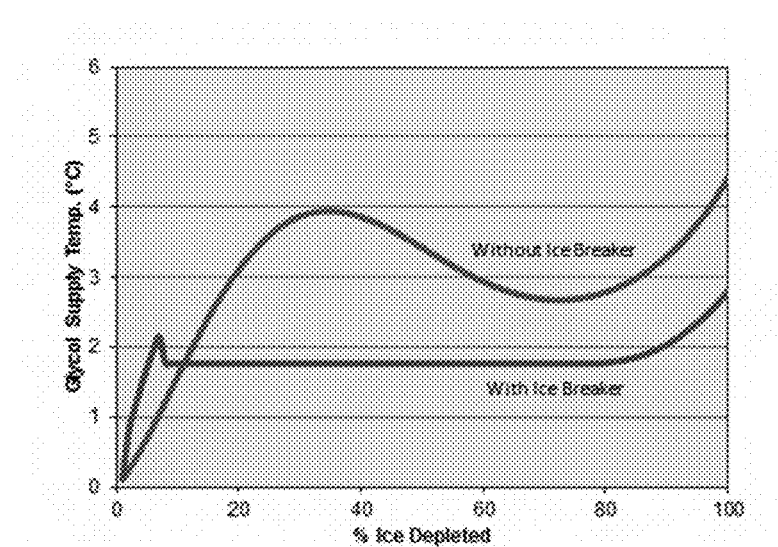
Figure 12 – Supply Temperature Comparison

THERMAL STORAGE ICE BREAKER APPARATUS

FIELD OF THE INVENTION

This invention relates to methods and apparatuses for thermal storage.

BACKGROUND OF THE INVENTION

Thermal ice storage systems have recently been migrating to internal melt systems because of the ease of maintenance and simplicity of construction inherent to these systems as compared to external melt systems. One of the major hurdles of internal melt systems is the rise in glycol temperature over time during the melt cycle before the ice "breaks out," dislodging from the tube and exposing the coil surface to the bulk liquid water in the tank. It is well known that internal melt thermal ice storage systems are limited in their ability to provide consistent glycol supply temperature during melt. This is due to the meniscus of liquid water that forms between the ice and tube during the melt and before breakout. This meniscus is very still, hence transfers heat at a low rate between the tube and ice, effectively insulating the coil surface from the ice. The glycol supply temperature rises during melt until the meniscus breaks through the ice surface and allows the ice to float free from the tube. Several methods have been implemented to overcome this limitation, see, for example, U.S. Pat. No. 4,831,831, but all of these solutions require additional equipment be added to the system, increasing cost and complexity of operation.

SUMMARY OF THE INVENTION

The present invention solves this temperature rise problem by using a tube structure that bisects the meniscus through the ice, allowing the ice to "break" from the tube near the initiation of melting, effectively cutting the ice donut in half and allowing it to float free of the tube near the initiation of melting and meniscus formation and keeping the discharge temperature low and constant. The ice may not need to float free to allow the tank water to commute to the tube surface. The inventors discovered during testing of stainless steel ice thickness probes, if the probe passed to the outside of the ice to the tank water, an inconvenient meniscus of water formed around the projection. Ice never encapsulated the probe. Thermal conductivity of the projection is very important, as ice will encapsulate more conductive materials, like Aluminum, during ice build. The invention capitalizes on this projection effect by allowing the ice to form a meniscus of water from the water in the tank down to the tube surface near the initiation of melt. Breakout of the ice happens much sooner than without the ice breaker projection.

According to an embodiment of the invention, a thermal storage ice breaker is used to bisect the liquid water meniscus during melt so it passes to the outside of the ice during melt. Special projections added to the tube cut the ice in half around the tube during melt. This allows the ice to float free of the tube which in turn allows better conduction of heat from the tube to the bulk ice-water in the tank. Alternatively, the ice may not float as it is held at its distal ends while the tank water freely commutes to the tube surface.

Accordingly, there is provided according to the invention, an internal melt thermal ice storage device including an ice build/melt coil mounted in a container configured to hold a thermal storage medium, in which the ice build/melt coil has a thermal transfer medium input end and a thermal transfer medium output end, both of which are connected to a thermal transfer medium source, where the ice build/melt coil is made of a plurality of tubes, one or more of which tubes have projections or "fins" configured to transmit heat from the thermal transfer medium circulating in the tubes to distal areas of the ice rings surrounding the tubes, thereby defining a shape of a liquid meniscus surrounding the tubes (including the projections/fins) during the melt cycle of the system According to another embodiment of the invention, the tubes have an oval shape with a vertically oriented major axis.

According to a further embodiment of the invention, each tube has a first projection extending vertically up from a top exterior surface of said tube, and a second projection extending vertically down from a bottom exterior surface of said tube.

According to a further embodiment of the invention, each tube has a plurality of projections extending away from an exterior surface of said tube and spaced equally about said tube.

According to a further embodiment of the invention, each tube has a plurality of projections extending away from an exterior surface of said tube and spaced unequally about the tube.

According to a further embodiment of the invention, the thermal storage medium is water.

According to a further embodiment of the invention, the thermal transfer medium is glycol, ammonia or other halocarbon refrigerants.

According to a further embodiment of the invention, the projections have a specific thermal conductivity.

DESCRIPTION OF THE DRAWINGS

The subsequent description of the preferred embodiments of the present invention refers to the attached drawings, wherein:

FIG. 11 shows ice breaker tubes according to six different embodiments.

FIG. 12 shows relative glycol supply temperature performance of the a prior art ice coil tube in an internal melt ice coil as compared to an ice breaker tube according to the invention.

DETAILED DESCRIPTION OF THE INVENTION

Figure 1:
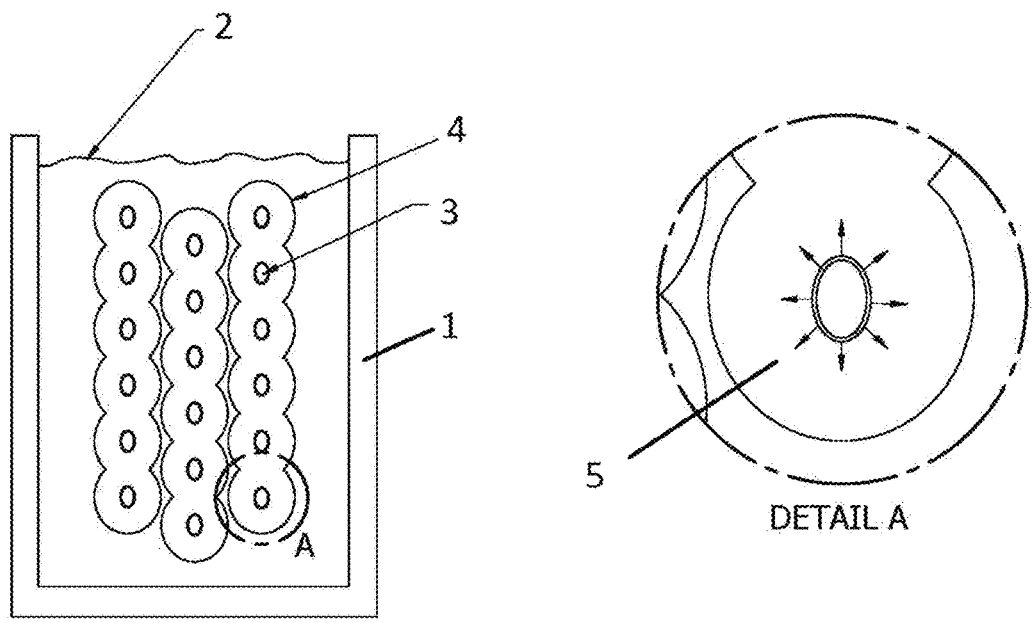
FIG. 1 is a schematic showing the major components of a thermal ice storage coil.

FIG. 1 shows the major components of a prior art internal melt ice coil system in cross section. Ice water tank 1 holds a plurality of tubes 3 filled with glycol. The plurality of tubes 3 is submerged in water 2. When cold glycol flows through the plurality of tubes 3, the water 2 is converted to ice 4 around the tubes 3. Detail A shows a close-up view of the tube 3 and ice 4 with its melt direction 5 away from the tube surface.

Figure 2:
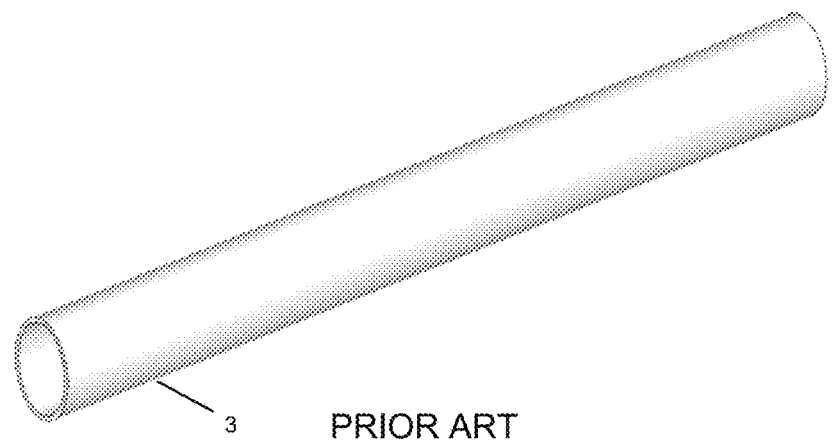
FIG. 2 shows an outside perspective view of a standard ice coil tube.

FIG. 2 illustrates an isometric view of a prior art ice coil tube.

Figure 3:
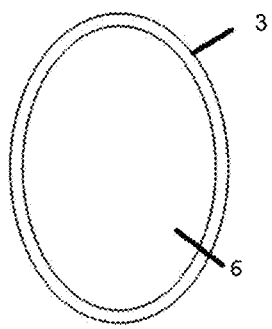
FIG. 3 shows a cross-sectional view of a standard ice coil tube.

FIG. 3 shows a cross section of the tube in FIG. 2. In use, the tube 3 surrounds a glycol solution 6.

Figure 4A:
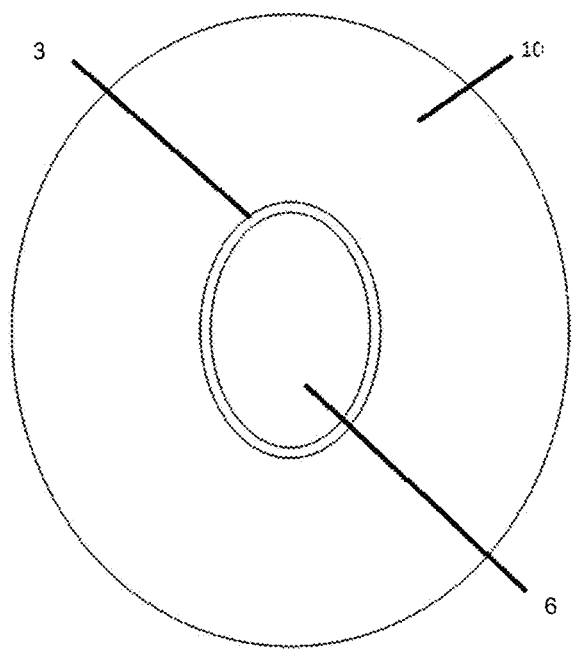
FIGS. 4a through 4d show the progression of melt of a standard ice coil.

FIG. 4a shows an ice coil tube with ice build in cross section. An ice coil tube 3 is filled with a cold glycol solution 6 that has previously built a layer of ice 10 around the tube 3.

Figure 4B:
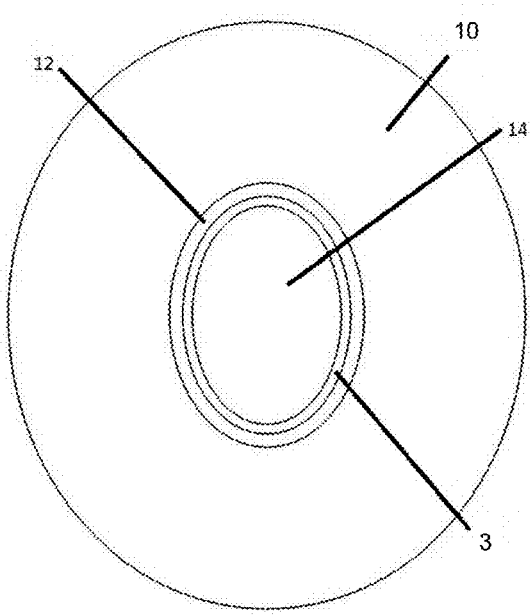

FIG. 4b shows an ice coil tube with ice first starting to melt. Tube 3 contains a warm glycol solution which has initiated heating of the tube. A meniscus of water 12 forms as the ice 10 begins to melt.

Figure 4C:
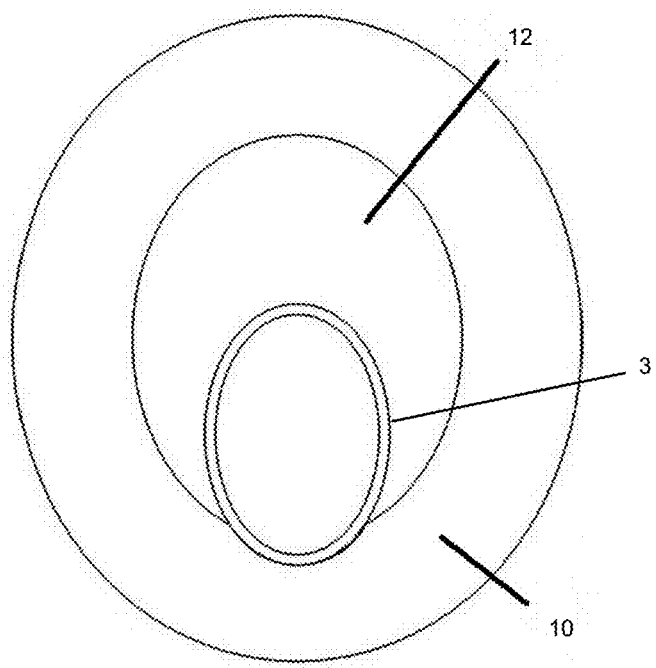

FIG. 4c shows an ice coil tube well into the melt cycle. At this point the meniscus of water 12 is large but has not penetrated the ice 10. During this stage, the ice 10 floats up until it touches the tube 3.

Figure 4D:
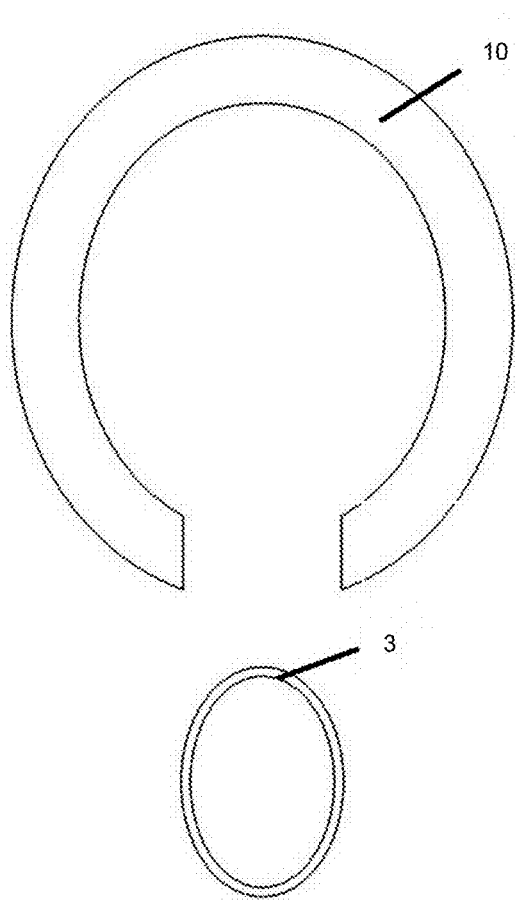

FIG. 4d shows "breakout" of the ice. The ice 10 melts free from the tube 3 and floats. Just prior to the stage shown in 4d, the ice may also break free from the tube, but be constrained from floating as it is held by its distal/bottom ends.

Figure 5:
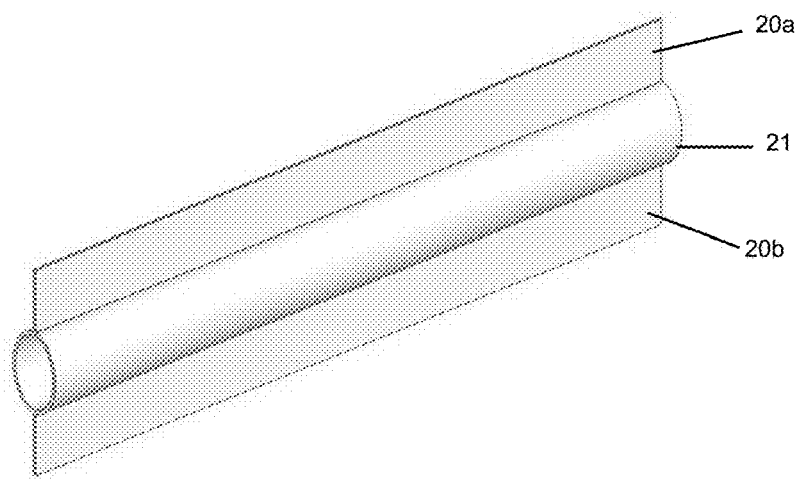
FIG. 5 shows an outside perspective view of an ice breaker tube according to an embodiment of the invention.

FIG. 5 shows an isometric view of an ice breaker tube according to an embodiment of the invention, having a generally oval-shaped tube fitted with projections or "fins" extending from the top and bottom of the tube.

Figure 6:
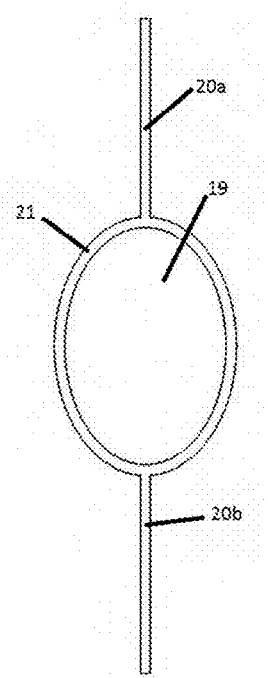
FIG. 6 shows a cross-sectional view of an ice breaker tube according to the embodiment of FIG. 5.

FIG. 6 shows the main components of the ice breaker tube embodiment of FIG. 5 in cross section. Tube 21 is filled with glycol 19. Projections 20a and 20b connect to the tube 21. The projections may be fixed to the tube according to any known manner, including integrally cast with the tube, welded to the tube, etc.

Figure 7A:
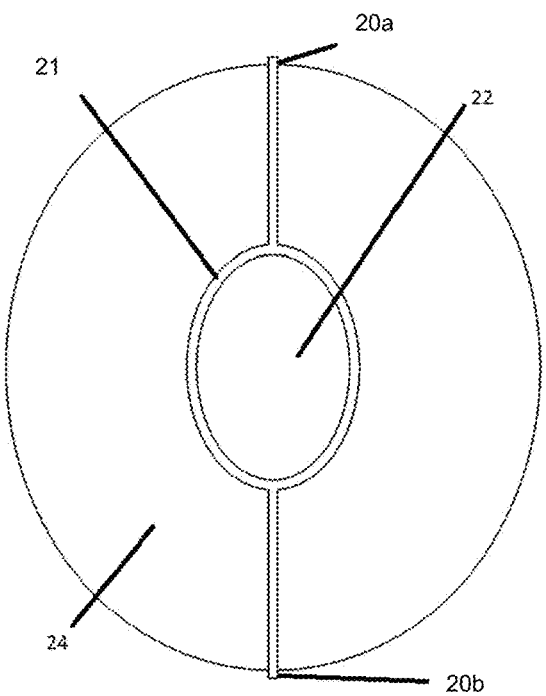
FIGS. 7a through 7c show the progression of melt with an ice breaker tube according to the embodiment shown in FIGS. 5 and 6.

FIG. 7a shows a cross section of an ice breaker tube according to an embodiment of the invention in which ice has formed and before ice melt begins. Tube 21 is filled with cold glycol 22 which has previously formed ice 24. Projections 20a and 20b pass to the outside of the ice into the water surrounding the ice.

Figure 7B:
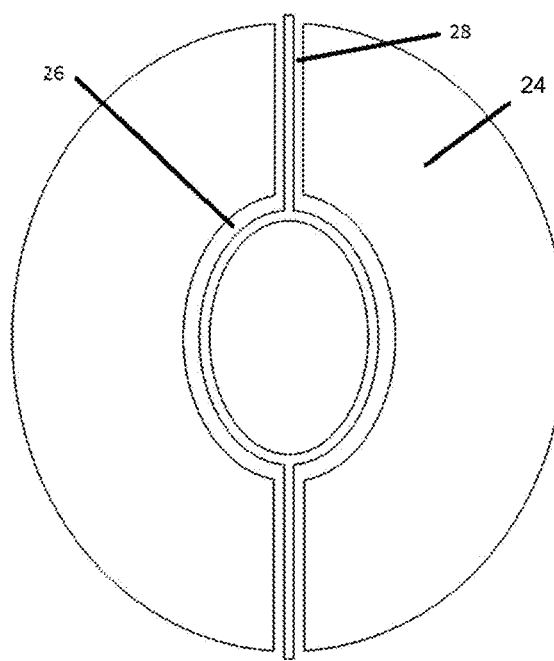

FIG. 7b shows the embodiment of the ice breaker tube of FIG. 7a at the initiation of melt. The water meniscus around the tube projects to the outside of the ice 24 in channel 28.

Figure 7C:
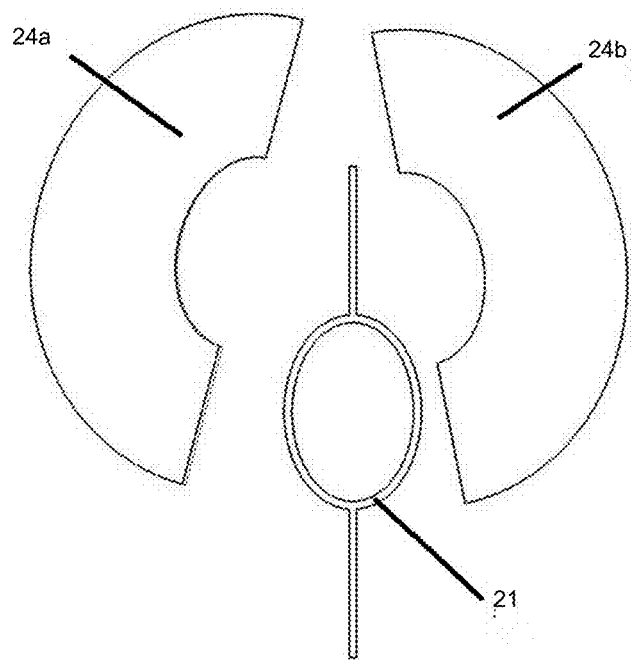

FIG. 7c shows "breakout" of the ice. Tube 21 is in contact with the bulk water in the tank as ice 24a and 24b float free of the tube 21.

Figure 8:
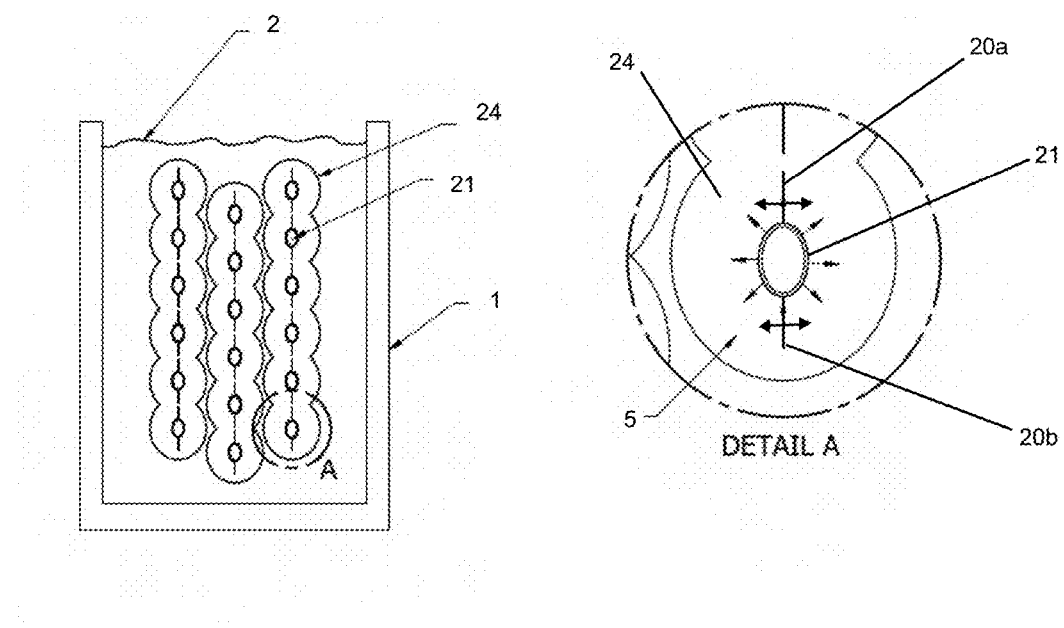
FIG. 8 shows a thermal ice storage coil using tubes with projections according to the invention.

FIG. 8 shows a thermal ice storage coil using tubes with projections according to the invention. Ice water tank 1 holds a plurality of tubes 21 filled with glycol, which tubes are fitted with projections 20a and 20b. The plurality of tubes 21 is submerged in water 2. When cold glycol flows through the plurality of tubes 21, the water 2 is converted to ice 24 around the tubes 21. Detail A shows a close-up view of the tube 21 and ice 24 with its melt direction 5 away from the tube and projection surfaces.

Figure 9:
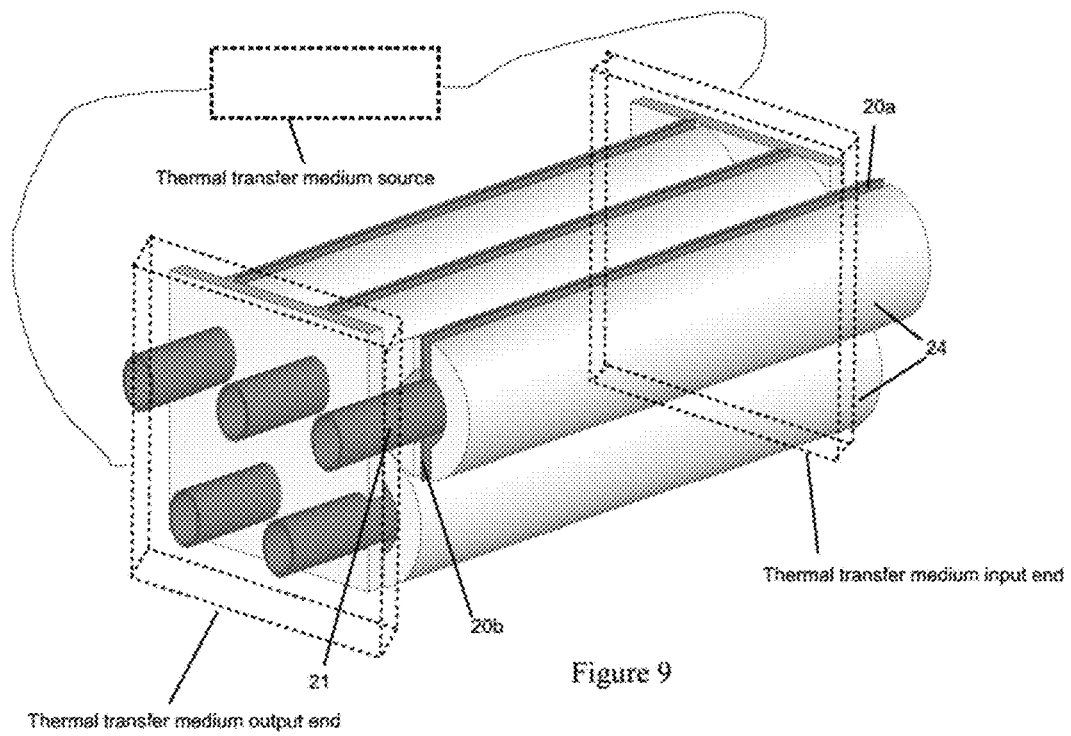
FIG. 9 is a cutaway close-up view of a thermal ice storage coil according to an embodiment of the invention, during a melt phase, showing ice separated from the tubes but constrained from floating by adjacent structures.

FIG. 9 is a cutaway close-up view of a thermal ice storage coil according to an embodiment of the invention, during a melt phase, showing ice separated from the tubes but constrained from floating by adjacent structures.

Figure 10:
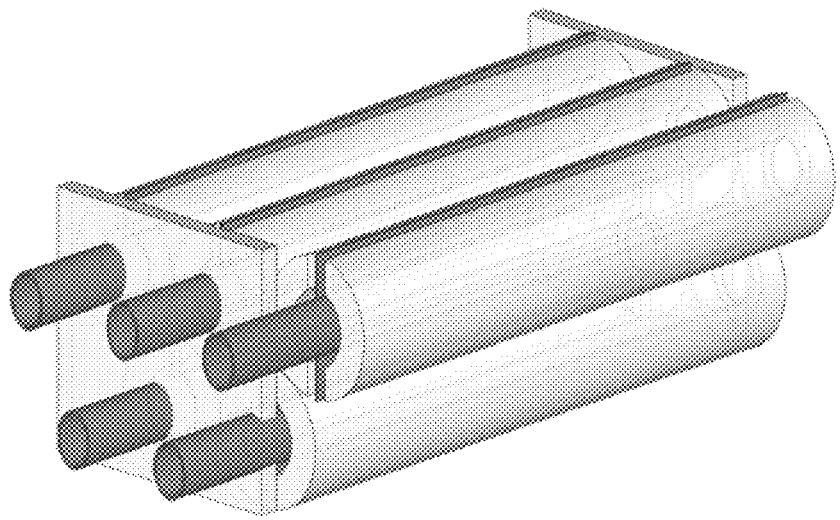
FIG. 10 is another view of the embodiment of claim 9, showing hidden structures in dashed lines.

FIG. 10 is another view of the embodiment of claim 9, showing hidden structures in dashed lines. As can be seen from FIGS. 9 and 10, even though the ice is separated from the tube by the meniscus, the ice is initially constrained from moving to the surface of the water in the tank by adjacent tubes, ice pieces, and the ends and sides of the tank.

FIG. 11 shows alternative embodiments of ice breaker tubes according to the invention. According to alternative embodiments of the invention, the tube may be provided with two extensions, three extensions, four extensions, five extensions (not shown), six extensions (not shown), seven extensions (not shown), eight extensions, or more, in order to accelerate ice breakout from the tube. According to various embodiments, the extensions may be distributed equally or unequally around the tube, and asymmetrically or symmetrically around the tube. The tube itself may be round, oval, or extended oval in shape.

FIG. 12 is a chart plotting the temperature of the glycol supply circulating through the coil versus percentage of ice melted during a melt cycle for an ice coil with prior art ice coil tubes and for an ice coil with ice breaker tubes according to the present invention, in particular the embodiment shown in FIGS. 5 and 6. As shown in the chart, the temperature of the glycol supply with the prior art ice coil has a much higher average temperature, and fluctuates significantly, as compared to the temperature of the glycol supply in the ice coil with the ice breaker tubes of the present invention. Accordingly, the present invention provides more effective and more efficient cooling with little additional capital expenditure.

The invention claimed is:

1. An internal melt thermal ice storage device comprising:
an ice build/melt coil mounted in an ice water tank configured to hold a thermal storage medium, said ice build/melt coil having a thermal transfer medium input end and a thermal transfer medium output end, both of which are connected to a thermal transfer medium source;
said ice build/melt coil comprising a plurality of tubes, wherein one or more of said tubes bear ice breaker projections configured to transmit heat from a thermal transfer medium circulating in said tubes to distal areas of an ice ring surrounding said tube thereby defining a shape of a liquid meniscus surrounding said tube and said ice breaker projections during a melt cycle of said internal melt thermal ice storage system; wherein each said tube has a first fin extending vertically up from a top exterior surface of said tube and a second fin extending vertically down from a bottom exterior surface of said tube, and wherein said first and second fins run along a longitudinal length of said tube.

2. The device according to claim 1, wherein said tubes have an oval shape with a vertically oriented major axis.

3. The device according to claim 1, wherein each said tube has a third fin extending away from an exterior surface of said tube and running along a longitudinal length of said tube, wherein said first, second and third fins are spaced equally about said tube.

4. The device according to claim 1, wherein each said tube has a third fin extending away from an exterior surface of said tube and running along a longitudinal length of said tube, wherein said first, second and third fins are spaced unequally about said tube.

5. The device according to claim 1, wherein said thermal storage medium is water.

6. The device according to claim 1, wherein said thermal transfer medium is glycol.

* * * * *